US012632494B2

(12) United States Patent
Hyun et al.

(10) Patent No.: US 12,632,494 B2
(45) Date of Patent: May 19, 2026

(54) IMAGE CLUSTERING METHOD AND APPARATUS

(71) Applicant: IUCF-HYU (INDUSTRY-UNIVERSITY COOPERATION FOUNDATION HANYANG UNIVERSITY), Seoul (KR)

(72) Inventors: Kyung Hoon Hyun, Seoul (KR); Ki Hoon Son, Daejeon (KR); Seung Won Lee, Goyang-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 19/029,284

(22) Filed: Jan. 17, 2025

(65) Prior Publication Data

US 2025/0165524 A1     May 22, 2025

Related U.S. Application Data

(63) Continuation of application No. PCT/KR2023/008485, filed on Jun. 20, 2023.

(30) Foreign Application Priority Data

Jul. 20, 2022     (KR) ........................ 10-2022-0089270

(51) Int. Cl.
    G06F 16/55     (2019.01)
    G06F 16/58     (2019.01)
(52) U.S. Cl.
    CPC .......... G06F 16/55 (2019.01); G06F 16/5866 (2019.01)

(58) Field of Classification Search
    CPC ...... G06F 16/55; G06F 16/5866; G06F 16/56; G06T 3/40; G06T 7/00; G06T 7/0006;
    (Continued)

(56) References Cited

U.S. PATENT DOCUMENTS 8,306,281 B2 * 11/2012 Matsubara ............ G06F 16/532
                                                              382/218
2007/0078846 A1 *  4/2007 Gulli ..................... G06F 16/951
                                                              707/999.005

(Continued)

FOREIGN PATENT DOCUMENTS

KR         10-0706389 B1     4/2007
KR         10-1644174 B1     7/2016
                (Continued)

OTHER PUBLICATIONS

Kim, Hyeong-Gyun, and Sang-hee Lee. "Automated Infographic Recommendation System Based on Machine Learning.", Nov. 28, 2021, Journal of Digital Convergence 19, No. 11, doi:10.14400/JDC.2021.19.11.017, pp. 17-22.
(Continued)

*Primary Examiner* — Jared M Bibbee

(57)     ABSTRACT

A design image clustering method comprises the steps of: calculating the degree of similarity between pieces of target design element information selected by a user among pieces of design element information about a target design image and a plurality of reference design images stored in a database; clustering, on the basis of the degree of similarity, the reference design images into a plurality of clusters; and generating, for each cluster, at least one of at least one representative design image, an overlap image for the representative design image, and the degree of similarity between a center vector of each cluster and the target design image.

5 Claims, 4 Drawing Sheets

(58) Field of Classification Search
CPC ...... G06V 10/46; G06V 10/74; G06V 10/762;
G06V 10/764; G06V 10/469; G06V
10/761
See application file for complete search history.

(56) References Cited

U.S. PATENT DOCUMENTS

| | | | |
|---|---|---|---|
| 2011/0096075 A1* | 4/2011 | Borders | G06T 11/60 |
| | | | 345/441 |
| 2014/0204123 A1* | 7/2014 | Begeja | H04N 21/47 |
| | | | 345/660 |
| 2016/0004695 A1* | 1/2016 | Yang | G06F 3/0485 |
| | | | 707/738 |
| 2020/0234037 A1 | 7/2020 | Ogura et al. | |
| 2021/0103969 A1* | 4/2021 | Sollami | G06N 3/0464 |
| 2021/0294851 A1 | 9/2021 | Talwadker | |
| 2021/0311984 A1* | 10/2021 | Saito | G06F 18/24323 |
| 2021/0339630 A1* | 11/2021 | Lee | B60K 35/22 |
| 2021/0365713 A1* | 11/2021 | Gan | G06F 18/25 |
| 2022/0292809 A1* | 9/2022 | Choudhary | G06V 20/48 |
| 2024/0095775 A1* | 3/2024 | Takamoto | G06V 40/18 |
| 2024/0095786 A1* | 3/2024 | Takamoto | G06Q 50/10 |

FOREIGN PATENT DOCUMENTS

| | | | |
|---|---|---|---|
| KR | 10-2017-0046881 A | 5/2017 |
| KR | 10-1934108 B1 | 12/2018 |
| KR | 10-2020-0044644 A | 4/2020 |
| KR | 10-2022-0015273 A | 2/2022 |

OTHER PUBLICATIONS

Liu, W., d'Oliveira, R. L., Beaudouin-Lafon, M., & Rioul, O, 2017, May, Bignav: Bayesian information gain for guiding multiscale navigation. In Proceedings of the 2017 CHI Conference on Human Factors in Computing Systems, pp. 5869-5880.
Wanyu Liu, Olivier Rioul, Joanna Mcgrenere, Wendy Mackay, Michel Beaudouin-Lafon, Apr. 2018, Bayesian information gain for fast file retrieval. In Proceedings of the 2018 CHI Conference on Human Factors in Computing Systems, pp. 1-13.
International Search Report (ISR) of PCT Application No. PCT/KR2023/008485 filed on Jun. 20, 2023.
Written Opinion of International Search Authority of PCT Application No. PCT/KR2023/008485 filed on Jun. 20, 2023.
Kim, Hyeong-Gyun, and Sang-hee Lee. "Automated Infographic Recommendation System Based on Machine Learning." Journal of Digital Convergence 19, No. 11 (Nov. 28, 2021): 17-22. doi:10.14400/JDC.2021.19.11.017.

* cited by examiner

IMAGE CLUSTERING METHOD AND APPARATUS

CROSS-REFERENCE TO RELATED APPLICATIONS

This application is a bypass continuation of pending PCT International Application No. PCT/KR2023/008485, which was filed on Jun. 20, 2023, and which claims priority from and the benefit of Korean Patent Application No. 10-2022-0089270 filed with the Korean Intellectual Property Office on Jul. 20, 2022. The entire contents of the aforementioned patent applications are incorporated herein by reference.

BACKGROUND

1. Technical Field

The present disclosure relates to a design image clustering method and apparatus, and more particularly, to a design image clustering method and apparatus capable of supporting design image search.

2. Description of the Related Art

There is a lot of research and development on how to accurately search for the design images that users are looking for.

The BIG (Bayesian Information Gain) framework is one of the information search methods, and is an information search method based on Bayesian theory. Based on Bayesian theory, the BIG framework updates the probability that information will become a target, and calculates the information gain for all combinations of information, thereby providing the next view where the information gain is maximized.

Recently, various applications such as BIGnav and BIG-file have been proposed by applying the BIG framework to navigation or file search, in papers such as "Liu, W., d'Oliveira, R. L., Beaudouin-Lafon, M., &Rioul, O. (2017, May). Bignav: Bayesian information gain for guiding multiscale navigation. In Proceedings of the 2017 CHI Conference on Human Factors in Computing Systems (pp. 5869-5880)", "Liu, W., Rioul, O., Mcgrenere, J., Mackay, W. E., &Beaudouin-Lafon, M. (2018, April). BIGFile: Bayesian information gain for fast file retrieval. In Proceedings of the 2018 CHI Conference on Human Factors in Computing Systems (pp. 1-13)".

SUMMARY OF THE INVENTION

An object of the present disclosure is to provide a design image clustering method and apparatus capable of supporting a user's design image search.

According to one embodiment of the present disclosure, conceived to achieve the objectives above, a design image clustering method is provided, including the steps of: calculating the degree of similarity between pieces of target design element information selected by a user among pieces of design element information about a target design image and a plurality of reference design images stored in a database; clustering, on the basis of the degree of similarity, the reference design images into a plurality of clusters; and generating, for each cluster, at least one of at least one representative design image, an overlap image for the representative design image, and the degree of similarity between a center vector of each cluster and the target design image.

In addition, according to another embodiment of the present disclosure, conceived to achieve the objectives above, a design image clustering apparatus is provided, comprising a memory; and at least one processor electrically connected to the memory, wherein the processor calculates the degree of similarity between pieces of target design element information selected by a user among pieces of design element information about a target design image and a plurality of reference design images stored in a database, clusters, on the basis of the degree of similarity, the reference design images into a plurality of clusters, and generates, for each cluster, at least one of at least one representative design image, an overlap image for the representative design image, and the degree of similarity between a center vector of each cluster and the target design image.

According to one embodiment of the present disclosure, design images are clustered into a plurality of clusters according to the degree of similarity, and information for supporting design search is displayed for each cluster, thereby enabling a user to effectively search for design images.

DETAILED DESCRIPTION OF THE INVENTION

Figure 1:
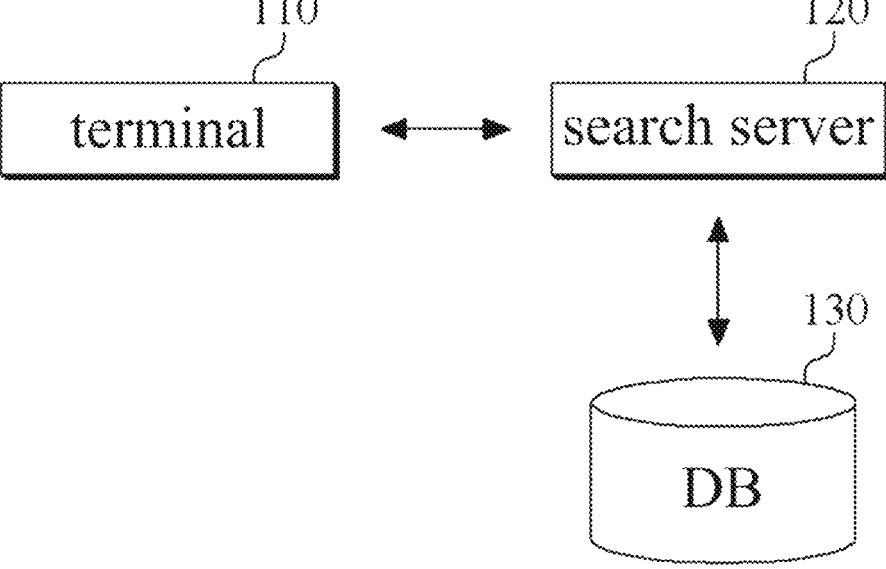
FIG. 1 is a drawing for explaining a design image search system according to one embodiment of the present disclosure.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein. Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

The present disclosure relates to a design image clustering method and apparatus capable of supporting search of design images.

It is not easy for a user to check the numerous reference design images stored in the database one by one to find the reference design image they want. Even when searching for design images using search conditions, it is not easy to reach a conclusion that the user can find the reference design image they want, due to the special nature of the search target, which is the image.

Accordingly, one embodiment of the present disclosure clusters reference design images stored in a database into a plurality of clusters according to the degree of similarity, and displays information to support user search in the clusters. The search support information displayed in the clusters may include representative design images for each cluster, an overlap images for the representative design images, and a degree of similarity between a target image input by the user and the cluster.

A user can select a cluster including a desired reference design image among a plurality of clusters by checking the search support information displayed in the cluster, and one embodiment of the present disclosure can provide the user with reference images included in the cluster selected by the user.

A design image clustering method according to one embodiment of the present disclosure may be performed in a computing device including a memory and at least one processor electrically connected to the memory. The processor performs a series of processes for design image clustering.

Hereinafter, embodiments according to the present disclosure will be described in detail with reference to the attached drawings.

Figure 2:
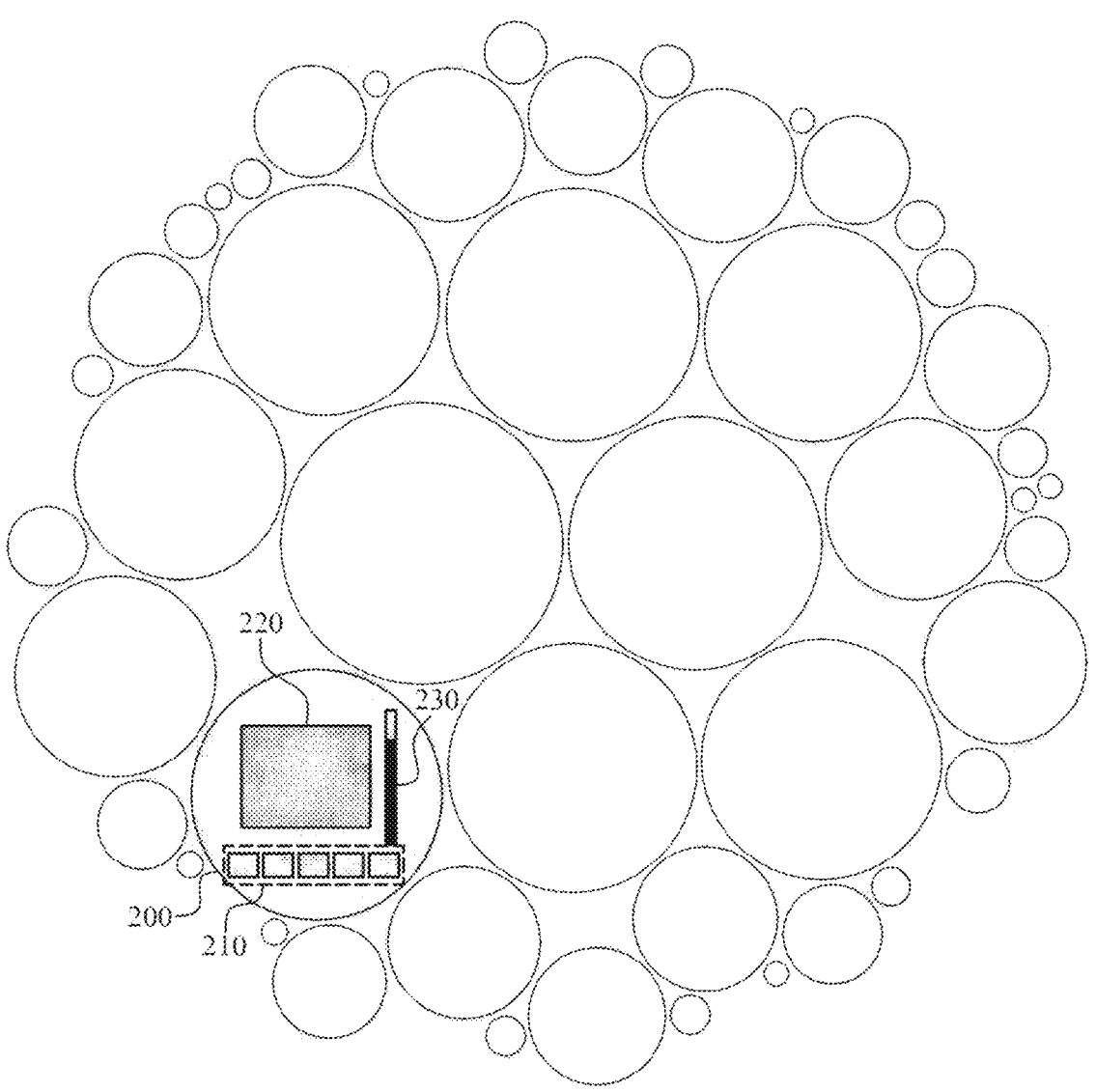
FIG. 2 is a drawing for explaining a cluster according to one embodiment of the present disclosure.

FIG. 1 is a drawing for explaining a design image search system according to one embodiment of the present disclosure, and FIG. 2 is a drawing for explaining a cluster according to one embodiment of the present disclosure.

Referring to FIG. 1, a design image search system according to one embodiment of the present disclosure includes a terminal 110, a search server 120, and a database 130.

When a user inputs a target design image into the terminal 110, the terminal 110 transmits target design element information selected by the user from among a plurality of design element information for the target design image to the search server 120. The target design element information may be input into the terminal 110 by the user, or the target design image may have a plurality of design element information pre-allocated.

Here, design element information means information about design elements that constitute a target design image, such as a drawing design image or a clothing design image. As an example, design element information of an architectural drawing design image may include the number of rooms, the location of rooms, the shape of rooms, the connection relationship of rooms, the layout of rooms, the overall shape (silhouette) of the architectural drawing, etc., and design element information of a clothing design image may include a pattern, a pattern shape, a type of clothing, the overall shape of clothing, etc. As an example, a user may input a target architectural drawing design into a terminal 110 and select the number of rooms and the location of rooms as target design element information.

The search server 120 calculates the degree of similarity between target design element information for a plurality of reference design images stored in the database 130 and target design element information for the target design image. The reference design image may have a plurality of design element information pre-allocated, and the degree of similarity may be calculated in various ways depending on the design element information.

For example, if the target design element information is the number of rooms, the degree of similarity can be calculated according to the difference in the number of rooms. If the number of rooms in the target design image is 5, the degree of similarity to a reference design image including the number of rooms that differ greatly from 5 will be small, and the degree of similarity to a reference design image including the number of rooms that differ less from 5 will be large.

Or, if the target design element information is the overall shape of the architectural drawing, the degree of similarity can be calculated according to the difference in shape. If the overall shape of the target design image is a square, the degree of similarity to a reference design image whose overall shape is a square will be large, and the degree of similarity to a reference design image whose overall shape is a circle will be small.

In addition, the search server 120 clusters the reference design images into a plurality of clusters according to the calculated similarity. For example, the search server 120 may divide the size of the degree of similarity into three levels and generate three clusters including reference design images with degree of similarity corresponding to each level.

The search server 120 generates search support information for each cluster and provides the cluster and search support information to the terminal 110. The search support information may include at least one of at least one representative design image, an overlap image for the representative design image, and a degree of similarity between the center vector of the cluster and the target design image.

Here, the representative design image refers to a reference design image representing the cluster among the reference design images included in the cluster, and the overlap image refers to an image in which a plurality of representative design images for each cluster are overlapped. In addition, the center vector of the cluster is a vector corresponding to the center of gravity of the cluster, and is a vector calculated by target design element information for the reference design image included in the cluster. The degree of similarity between the center vector of the cluster and the target design image refers to the degree of similarity between the center vector and the target design element information for the target design image.

The cluster and the search support information for the cluster provided from the search server 120 are displayed on the terminal 110. FIG. 2 shows an embodiment of the cluster and the search support information displayed on the terminal 110. In the embodiment of FIG. 2, five representative design images 210 and an overlap image 220 in which five representative design images are overlapped are displayed in each cluster 200, and the degree of similarity 230 between the center vector of the cluster 200 and the target design image is displayed in the cluster 200 in the form of a gauge bar. The size of the cluster may be proportional to the number of reference design images included in the cluster. In FIG. 2, the representative design images 210, the overlap image 220, and the degree of similarity 230 are displayed only in one cluster 200, but the representative design images 210, the overlap image 220, and the degree of similarity 230 may be displayed in the remaining clusters as well.

When a user selects a cluster 200 for which he/she wishes to conduct a detailed search after checking the cluster and search support information, reference design images included in the cluster 200 may be displayed on the terminal 100. As an example, when a user takes a zoom-in action on a cluster 200, reference design images included in the cluster may be visualized, and the user may perform a zoom-in action to enlarge the screen using a mouse.

Figure 3:
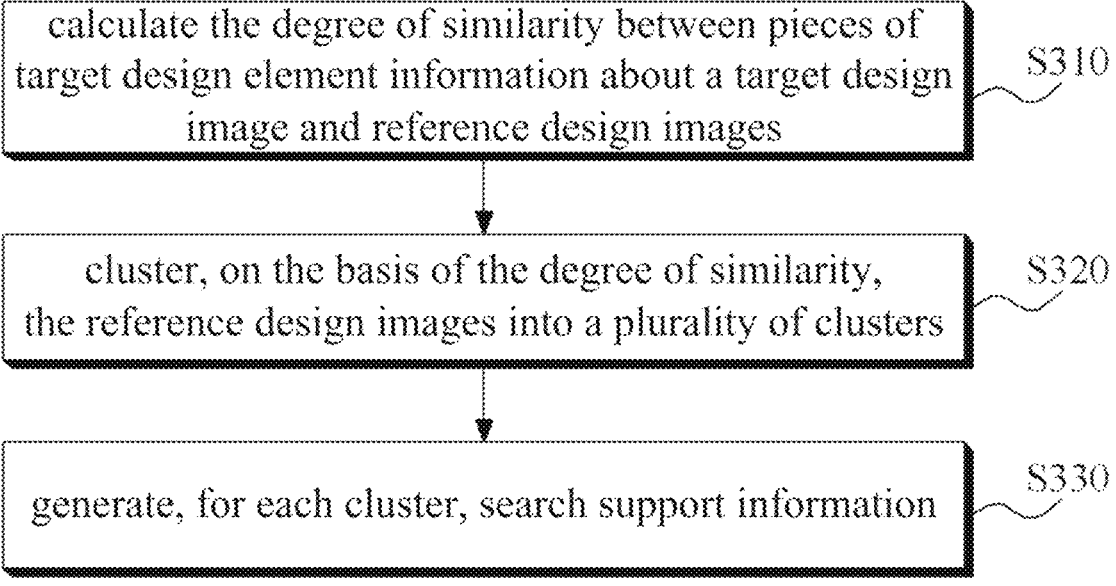
FIG. 3 is a drawing for explaining a design image clustering method according to one embodiment of the present disclosure.

FIG. 3 is a drawing for explaining a design image clustering method according to one embodiment of the present disclosure.

As described above, the design image clustering method according to one embodiment of the present disclosure may be performed in a computing device including a processor and a memory, and the search server described in FIG. 1 is an example of the computing device.

Referring to FIG. 3, a computing device according to an embodiment of the present disclosure calculates the degree of similarity between pieces of target design element information selected by a user, among pieces of design element information for a target design image and a plurality of reference design images stored in a database (S310). As described above, if the design image is a flat drawing design image, the design element information may include the number of rooms, the location of rooms, the shape of rooms, the connection relationship between rooms, the layout of rooms, the overall shape (silhouette) of the architectural drawing, etc. If there are a plurality of target design element information selected by the user, the degree of similarity is calculated for each target design element information.

The computing device clusters the reference design images into a plurality of clusters according to the degree of similarity calculated in step S310 (S320). That is, the degree of similarity between the target design element information for the reference design images included in one cluster and the target design element information for the target design image exhibits a similar value. Here, the size of the clustered cluster may be proportional to the number of reference design images included in the cluster.

When there are a plurality of target design element information, the computing device may cluster the reference design image based on an average value or a weighted average value of the degree of similarity for each target design element information.

In addition, the computing device generates search support information for each cluster (S330). The search support information may include at least one of at least one representative design image, an overlap image for the representative design image, and a degree of similarity between the center vector of the cluster and the target design image. Hereinafter, a method for generating a representative design image, an overlap image for the representative design image, and a degree of similarity between the center vector of the cluster and the target design image will be described in detail.

Representative Design Image

The computing device may select a preset number or less of representative design image from among the reference design images included in the cluster, based on a Euclidean distance between a center vector of the cluster and target design element information for reference design images included in the cluster.

The computing device may cluster reference design images using various clustering algorithms, and as an example, may cluster reference design images using a mean shift algorithm. The center of a cluster generated by the mean shift algorithm is a center of gravity of the cluster, and corresponds to an average value of target design element information for reference design images included in the cluster. If there are a plurality of target design element information, a center vector composed of a plurality of average values is determined.

The computing device may select a preset number of representative design images in order of their Euclidean distances, and if the number of reference designs included in the cluster is smaller than the preset number or the Euclidean distance is excessively large beyond a threshold value, a smaller number of representative design images than the preset number may be selected.

Overlap Image

Figure 4:
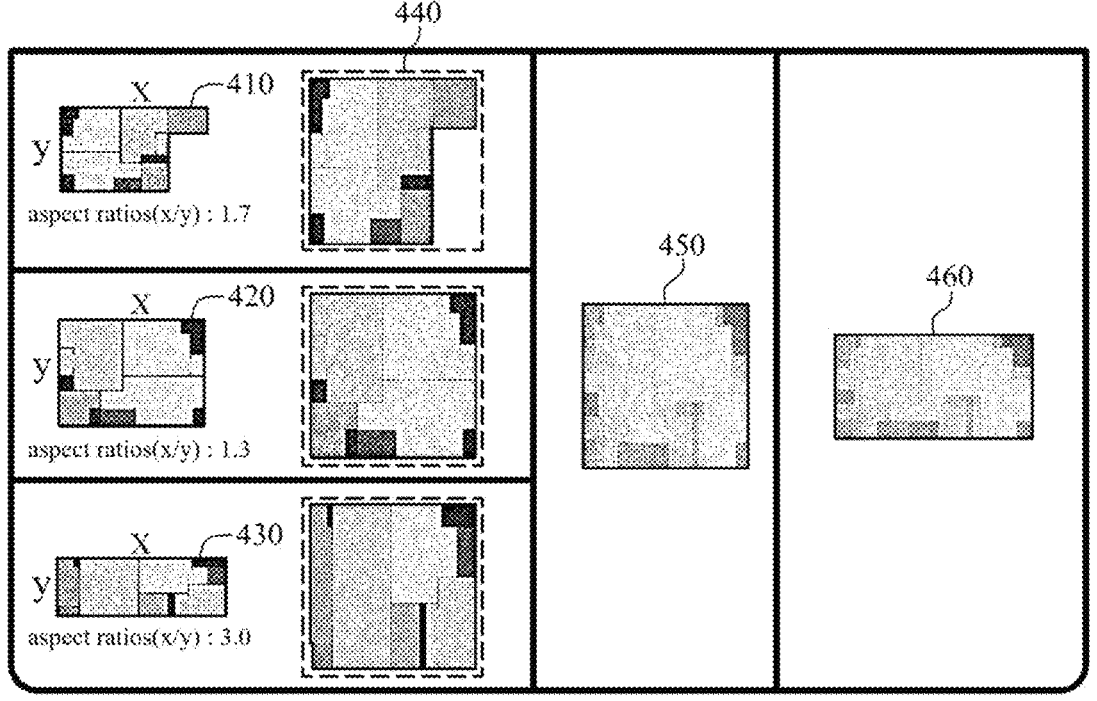
FIG. 4 is a drawing for explaining an overlap image according to one embodiment of the present disclosure.

FIG. 4 is a drawing for explaining an overlap image according to one embodiment of the present disclosure. FIG. 4 illustrates an example in which an overlap image is generated from three representative design images 410, 420 and 430.

Referring to FIG. 4, the computing device adjusts the size of the representative design images 410, 420 and 430 to generate an overlap image. The computing device may adjust the size of the representative design images 410, 420 and 430 so that the representative design images 410, 420 and 430 are included in a virtual frame 440 of a preset size and shape at a maximum size. That is, the computing device changes the size of the representative design images 410, 420 and 430 to the same size while maintaining the shape of the representative design images 410, 420 and 430. The shape of the virtual frame 440 may be set in various ways depending on the embodiment, and may be a square shape as illustrated in FIG. 4.

The computing device adjusts the transparency of the resized representative design images 410, 420 and 430 and overlaps them to generate an overlap image 450. The transparency may be adjusted according to the number of overlapping representative design images, and the computing device may determine the transparency in proportion to the number of overlapping representative design images. That is, as the number of overlapping representative design images increases, the overlap image may be generated with increased transparency of the representative design images.

In addition, in order for the features included in the representative design images 410, 420 and 430 to be identifiable even in an overlapping state, the features of the reference design images may be expressed in multiple colors, as illustrated in FIG. 4. For example, if the reference design image is a flat drawing design image, it may include rooms expressed in multiple colors. In addition, the colors may vary depending on the function or type of the room. For example, the colors may be different for each of the bathroom, kitchen, and living room.

In addition, the computing device may change the shape of the overlap image 550, according to the average aspect ratio of the representative design images 410, 420 and 430. As illustrated in FIG. 4, when the aspect ratios of the respective representative design images are 1.7, 1.3, and 3.0, the computing device generates an image 460 in which the shape of the overlap image 450 is changed so that the aspect ratio of the square-shaped overlap image 450 becomes 2:1, which is the average aspect ratio of the representative design images 410, 420 and 430.

Degree of Similarity Between the Center Vector of the Cluster and the Target Design Image As described above, the center vector of the cluster corresponds to the average value of the target design element information for the reference design image included in the cluster. The computing device may calculate the degree of similarity between the center vector and the target design element information for the target design image, and generate this degree of similarity in the form of a gauge bar. The degree of similarity may be calculated in the same manner as the degree of similarity calculation method between the target design element information for the target design image and the target design element information for the reference design image.

The technology described above can be implemented in the form of program instructions that may be performed using various computer means and can be recorded in a computer-readable recording medium. Such a computer-readable recording medium can include program instructions, data files, data structures, etc., alone or in combination. The program instructions recorded on the medium can be designed and configured specifically for the embodiments or can be a type of medium known to and used by the skilled person in the field of computer software. Examples of the computer-readable recording medium includes magnetic media such as a hard disc, a floppy disc and a magnetic tape, optical media such as a CD-ROM and a DVD, magneto-optical media such as a floptical disc, and a hardware device, such as a ROM, a RAM, a flash memory, which is specially designed to store and perform the program instruction. Examples of the program command include a machine language code generated by a compiler and a high-level language code executable by a computer through an interpreter and the like. The hardware devices may be configured to operate as one or more software modules to perform the operations of the embodiments, and vice versa.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A design image clustering method, comprising the steps of:

calculating a degree of similarity between pieces of target design element information selected by a user among pieces of design element information about a target design image and a plurality of reference design images stored in a database;

clustering, on the basis of the degree of similarity, the reference design images into a plurality of clusters; and generating, for each cluster, at least one of at least one representative design image, an overlap image for the representative design image, and the degree of similarity between a center vector of each cluster and the target design image, wherein the step of generating, for each cluster, at least one of at least one representative design image, the overlap image for the representative design image, and the degree of similarity between the center vector of each cluster and the target design image includes the steps of adjusting a size of the representative design images so that the representative design images are included in a virtual frame of a preset size and shape at a maximum size;

adjusting transparency of the representative design images and overlapping them to generate the overlap image; and changing the shape of the overlap image, according to an average aspect ratio of the representative design images.

2. The design image clustering method according to claim 1, wherein the step of generating, for each cluster, at least one of at least one representative design image, the overlap image for the representative design image, and the degree of similarity between the center vector of each cluster and the target design image includes selecting a preset number or less of representative design image from among the reference design images included in each cluster, based on a Euclidean distance between the center vector and target design element information for the reference design images included in each cluster.

3. The design image clustering method according to claim 1, wherein the virtual frame is a square-shaped frame, and the reference design images are images including a room expressed in multiple colors.

4. The design image clustering method according to claim 1, wherein the reference design images included in each cluster are visualized when the user takes a zoom-in action while at least one of the representative design image, the overlap image, and the degree of similarity between the center vector of each cluster and the target design image is displayed in each cluster.

5. A design image clustering apparatus, comprising:

a memory; and at least one processor electrically connected to the memory, wherein the processor calculates a degree of similarity between pieces of target design element information selected by a user among pieces of design element information about a target design image and a plurality of reference design images stored in a database, clusters, on the basis of the degree of similarity, the reference design images into a plurality of clusters, and generates, for each cluster, at least one of at least one representative design image, an overlap image for the representative design image, and the degree of similarity between a center vector of each cluster and the target design image, wherein the generating of the overlap image includes the steps of:

adjusting a size of the representative design images so that the representative design images are included in a virtual frame of a preset size and shape at a maximum size;

adjusting transparency of the representative design images and overlapping them to generate the overlap image; and changing the shape of the overlap image, according to an average aspect ratio of the representative design images.

* * * * *